US005389174A

United States Patent [19]

Hibsch et al.

[11] Patent Number: 5,389,174

[45] Date of Patent: Feb. 14, 1995

[54] METHOD OF MAKING A CONTROLLABLE FRAGRANCE SAMPLER

[75] Inventors: Susan Hibsch, Woodridge; Sharon Rubar, Countryside, both of Ill.

[73] Assignee: The Lehigh Press, Inc., Cherryhill, N.J.

[21] Appl. No.: 54,785

[22] Filed: Apr. 27, 1993

Related U.S. Application Data

[62] Division of Ser. No. 766,665, Sep. 25, 1991, Pat. No. 5,242,521.

[51] Int. Cl.[6] ........................ B32B 7/00; B32B 31/18; B42D 15/00

[52] U.S. Cl. .................................... 156/200; 156/204; 156/268; 156/269; 156/276; 156/270; 156/260; 283/106; 283/105; 283/56; 428/402.2

[58] Field of Search .......................... 428/321.5, 402.2; 156/276, 314, 324, 268, 291, 270, 269, 260, 200, 204; 206/232; 283/101, 104, 105, 106, 56

[56] References Cited

U.S. PATENT DOCUMENTS

| | | | |
|---|---|---|---|
| Re. 33,299 | 8/1990 | Sweeny et al. | 428/201 |
| 2,717,174 | 9/1955 | Casanovas | 299/24 |
| 3,685,734 | 8/1972 | Paciorek et al. | 239/56 |
| 4,484,768 | 11/1984 | Norfleet . | |
| 4,487,801 | 12/1984 | Turnbull et al. . | |
| 4,654,256 | 3/1987 | Doree et al. . | |
| 4,661,388 | 4/1987 | Charbonneau | 428/43 |
| 4,746,567 | 5/1988 | Zelter | 428/321.5 |
| 4,752,496 | 6/1988 | Fellows et al. | 427/27 |
| 4,824,503 | 4/1989 | Wilen | 156/204 |
| 4,847,124 | 7/1989 | Lux nee Andrieux | 428/34.2 |
| 4,867,821 | 9/1989 | Morgan | 156/267 X |
| 4,874,451 | 10/1989 | Boger et al. | 156/291 |
| 4,876,136 | 10/1989 | Chang et al. | 428/130 |
| 4,880,690 | 11/1989 | Szycher et al. | 428/224 |
| 4,889,755 | 12/1989 | Charbonneau | 428/42 |
| 4,898,633 | 2/1990 | Doree et al. | 156/145 |
| 4,923,063 | 7/1990 | Tararuj | 206/484 |
| 4,925,517 | 7/1990 | Charbonneau et al. | 156/276 |
| 4,939,888 | 7/1990 | Katz et al. | 53/411 |
| 4,940,584 | 7/1990 | Tararuj et al. | 424/401 |
| 4,952,400 | 8/1990 | Tararuj et al. | 424/401 |
| 4,986,868 | 1/1991 | Schmidt | 156/249 |
| 4,988,557 | 1/1991 | Charbonneau | 428/204 |
| 5,021,274 | 6/1991 | Beck et al. | 428/41 |
| 5,050,910 | 9/1991 | Schechter et al. | 283/105 |
| 5,055,153 | 10/1991 | Anderson | 156/260 X |

*Primary Examiner*—Michael W. Ball
*Assistant Examiner*—Michele K. Yoder
*Attorney, Agent, or Firm*—Trexler, Bushnell, Giangiorgi & Blackstone, Ltd.

[57] ABSTRACT

A method of making an improved fragrance-releasing sampler designed to prevent individuals from being unknowingly or involuntarily exposed to the fragrance. Preferably, the steps of the method are performed on a continuous moving web of material by in-line finishing equipment associated with a web offset printing press. The method includes applying slurry of adhesive and fragrance-containing microcapsules to a location on a moving web of material; longitudinally folding a margin of said moving web of material onto said slurry, or positioning a second web of material onto the location of said slurry; partially cutting around said slurry to define a removable element; and transversely severing the continuous moving web of material into individual fragrance-releasing samplers having a removable element carrying a fragrance which can be activated by separating said removable element from said sampler and spreading the thicknesses of the removable element apart.

Additional folding and cutting steps can also be performed to the moving web of material to create modified versions of the fragrance-carrying sampler. The sampler can also be designed to include integral pages for carrying graphic material such as are found in magazine or newspaper inserts.

2 Claims, 3 Drawing Sheets

METHOD OF MAKING A CONTROLLABLE FRAGRANCE SAMPLER

This is a divisional of application Ser. No. 07/766,665, filed on Sep. 25, 1991, now U.S. Pat. No. 5,242,521.

BACKGROUND OF THE INVENTION a. Field of the Invention

In general, the present invention relates to a method of making a device for releasing a sample of a fragrance, in a controlled fashion.

More specifically, the present invention relates to a method of making a plurality of such fragrance samplers in a continuous manner on in-line finishing equipment associated with a web offset printing press.

b. Description of Related Prior Art

Within the past several years, many products containing a releasable fragrance sample have been introduced into the market place. A variety of commercial applications for such products exist. Many perfume manufacturers and distributors, for example, now incorporate a sample of their fragrance product into advertising devices. Learning devices have also been developed for teaching the smells and odors associated with various items to children.

In many instances, it may be desirable to send such products directly to consumers through the United States Postal Service. Such devices may also be found inserted in magazines and newspapers which then may also be sent through the mail. On Apr. 29, 1991, however, the Drug and Household Substance Mailing Act of 1990 went into effect which, among other things, makes nonmailable "Any fragrance advertising sample not sealed, wrapped, treated or otherwise prepared in a manner reasonably designed to prevent individuals from being unknowingly or involuntarily exposed to it." Moreover, on Mar. 7, 1991, the U.S. Postal Service issued a proposed rule in an effort to implement the Act which requires a fragrance advertising sampler to be produced so that it cannot be activated except by opening a glued flap or binder, or by removing an overlying ply of paper. Accordingly, in an effort to comply with these regulations, and in order to produce a fragrance sampler which will not adversely affect those individuals who are allergic to certain scents carried by such devices, many improvements in such products have been proposed.

For example, U.S. Pat. No. 5,050,910, discloses and claims a fragrance-releasing insert for a magazine or book, or the like which includes a removable/detachable portion containing a fragrance sample. The fragrance sample carried by the insert cannot be released except by removing this detachable portion from the remainder of the insert and separating two sheets of material included therein. Separation of these two sheets causes the rupture of microcapsules containing a fragrance liquid, thereby releasing the fragrance into the air. Consequently, the release of the fragrance is controlled, not likely to contaminate adjacent pages of the magazine or book in which the insert is contained, or even the remainder of the insert itself. More importantly, the fragrance will most likely not be inhaled by consumers who may be allergic to such odors, and will only be sampled by those who desire to do so. In other words, it is constructed "in a manner reasonably designed to prevent individuals from being unknowingly or involuntarily exposed to it."

While U.S. Pat. No. 5,050,910 discloses an improved fragrance-releasing device, it does not disclose an efficient and effective manner of making such a device. Rather, it merely discloses a series of hand-folding, cutting, and gluing steps which can be performed to a substrate of material to produce the fragrance sampler claimed.

OBJECTS AND SUMMARY OF THE INVENTION

It is, therefore, a general objective of the present invention to provide an efficient and effective method of making a plurality of controllable fragrance samplers in a continuous fashion.

A more specific objective of the present invention is to provide a method of making a plurality of controllable fragrance samplers in a continuous manner on a web offset printing press and associated in-line finishing equipment through a series of folding, gluing and cutting steps.

Other objects and advantages of the invention will become apparent upon reading the following detailed description and upon reference to the drawings. Throughout the description, like referenced numerals refer to like parts.

Summarily stated, a preferred embodiment of the invention comprises a method of manufacturing a plurality of controllable fragrance samplers in a continuous manner including the steps of: applying a patch of slurry to a moving web of material, said slurry including a mixture of adhesive and fragrance-containing microcapsules; longitudinally folding said moving web of material along one margin thereof onto said patch of slurry, thereby securing said margin to said patch of slurry; partially cutting said moving web of material around said patch of slurry to define a removable element, and; transversely severing said moving web of material into individual fragrance-containing inserts, each including a removable element enclosing said slurry of adhesive and fragrance-containing microcapsules.

BRIEF DESCRIPTION OF THE DRAWINGS

The features of the present invention which are believed to be novel are set forth with a particularity in the appended claims. The organization and manner of operation of the invention, together with further objects and advantages thereof, may best be understood by reference to the following descriptions taken in connection with the accompanying drawings, in which;

DETAILED DESCRIPTION OF THE PREFERRED EMBODIMENTS

While the inventive method disclosed herein will be described in connection with a preferred embodiment, it will be understood that it is not intended to limit the invention to that embodiment. On the contrary, it is intended to cover all alternatives, modifications and equivalents as may be included within the spirit and scope of the invention.

Figure 1:
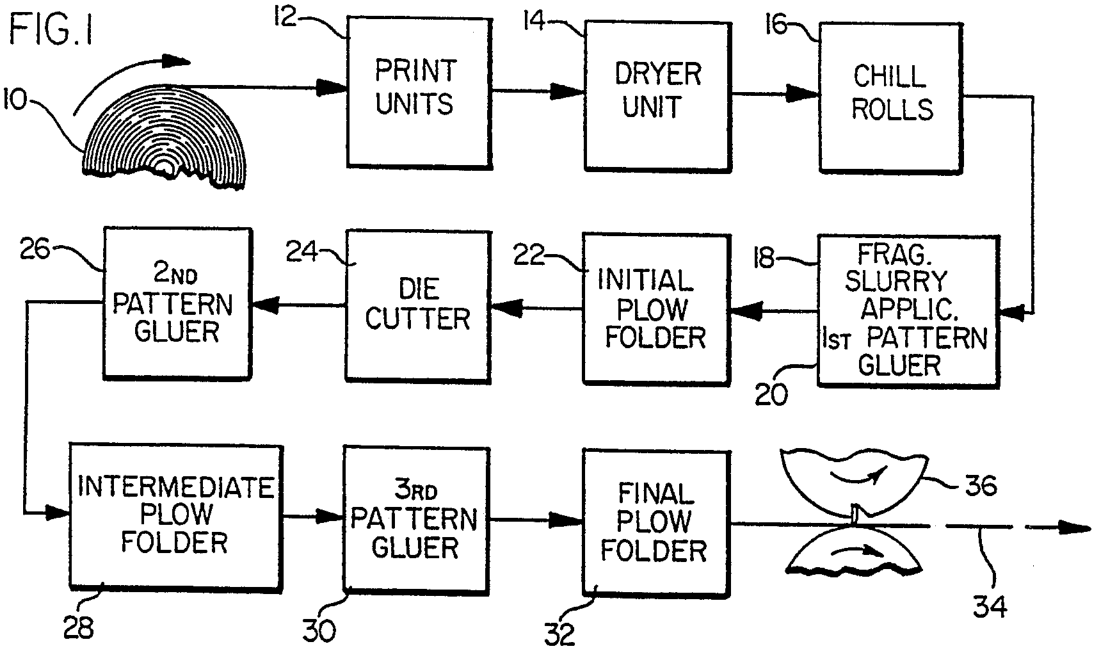
FIG. 1 is a block diagram of a preferred embodiment of the present invention.

Referring now in detail to the drawings, and initially to the block diagram of FIG. 1, the inventive method conducted in accordance with a preferred embodiment is illustrated without detailed reference to the equipment on which the sequence of steps comprising the method is preferably conducted. First, a web or substrate of material 10 is supplied and passed through a printing operation 12. Once printed, the ink deposited is dried by passing the web 10 through an oven unit 14, and then returned to ambient temperature by traveling over chill rolls 16. Proceeding next through the remainder of steps, the combination of which are unique to the present invention, an applicator 18 deposits a slurry 44 containing a mixture of fragrance-containing microcapsules and a binder or adhesive onto the moving web 10, and a gluer 20 deposits a pattern of glue 46 on the web 10, both at predetermined locations. The web 10 is next folded over onto itself by an initial plow folder 22 thereby sandwiching the fragrance slurry 44 and securing two sections of the web 10 together at the slurry patch 44, and where the glue pattern 46 was deposited.

Thereafter, the web 10 is partially cut by a die cutter 24 at one or more predetermined locations including an area surrounding the enclosed fragrance slurry 44. For purposes which will be explained in detail below, the web 10 then preferably proceeds through a second pattern gluer 26, an intermediate plow station 28, a third pattern gluer 30 and a final plow folder 32. Lastly, the processed web of material 10 is transversely severed into individual fragrance samplers 34 by a rotary cutter 36.

Figure 2:
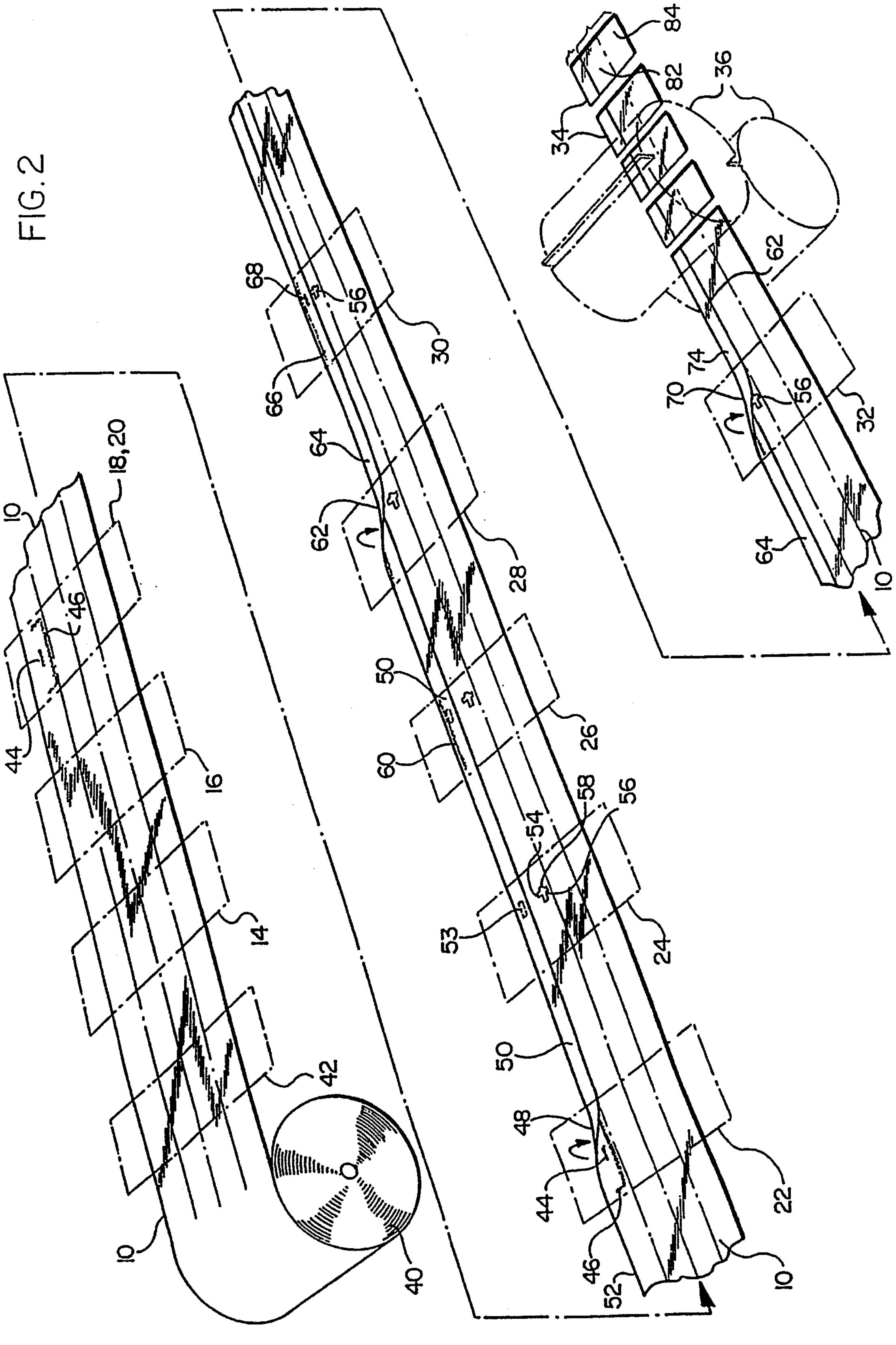
FIG. 2 is a pictorial representation of a preferred embodiment embracing the inventive method disclosed.
Figure 6:
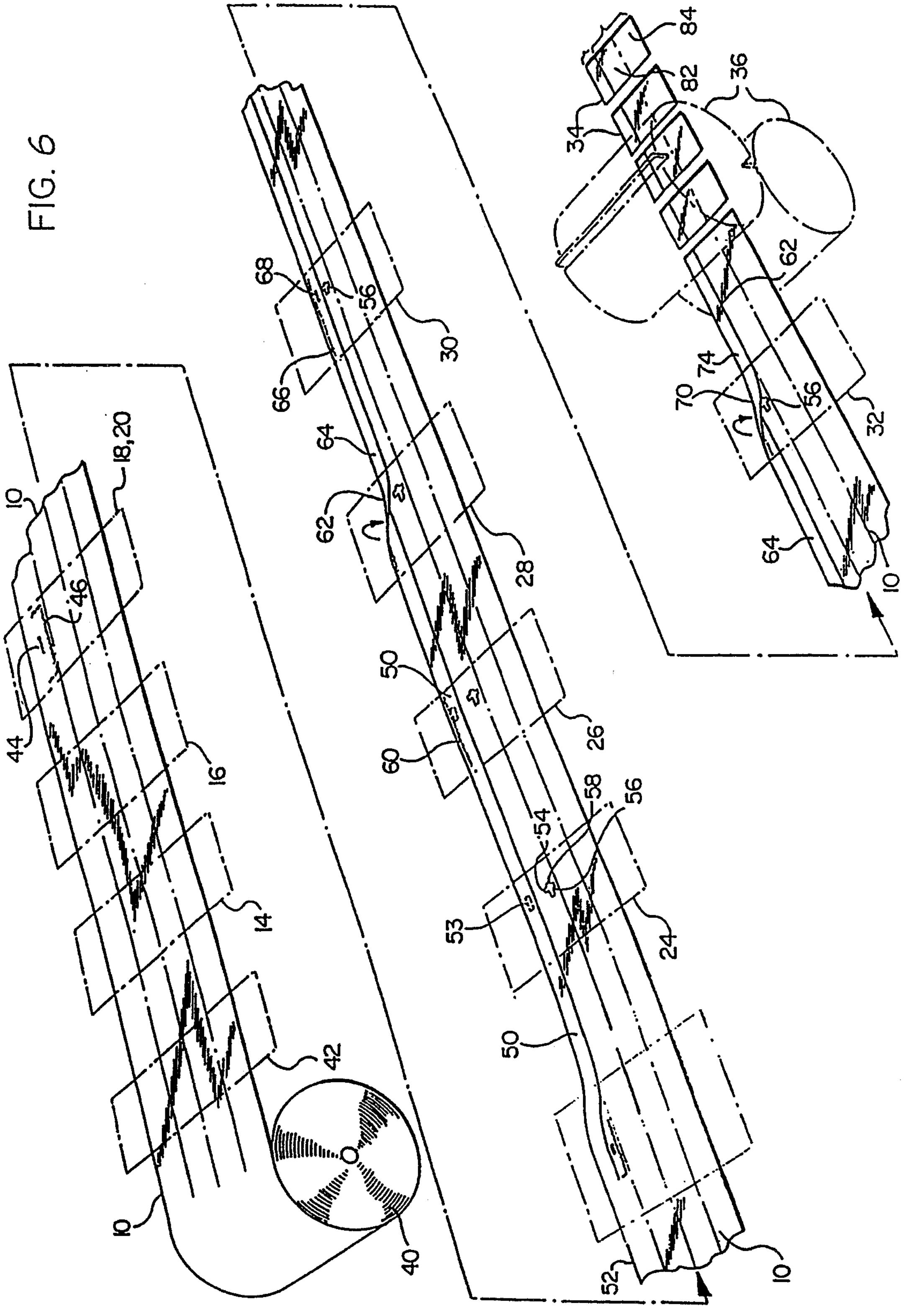
FIG. 6 is a pictorial representation of another embodiment embracing the inventive method disclosed.

For purposes of affording a more complete understanding of the inventive method, it is advantageous at this juncture to provide a description of a preferred embodiment combined with a more detailed description of the equipment upon which the method is preferably carried out. In FIG. 2, there is shown a supply roll 40 of the web of material 10 to be fed into the equipment utilized to perform the preferred method steps. A splicer unit (not shown) may also be included for interconnecting several supply rolls 40 in series, and providing uninterrupted operation of the method.

Under normal conditions, the web 10 is first infed into one or more printing towers 42 for providing graphics on the web 10, the operational aspects of which are well known in the art and therefore omitted here. Once printed, the web passes through a dryer 14 for evaporating water and ink solvents, and then over water-cooled chill rolls 16 for returning the web 10 to ambient temperature and solidifying any non-volatile ink resins. The operational aspects of the dryer 14 and the chill rolls 16 are also well known in the art and would be readily available to a person of ordinary skill therein.

Proceeding next through the unique combination of steps included in the present invention, and still referring to FIG. 2, there is shown a slurry applicator 18 which applies a predetermined area, or patch, of a slurry 44 to the moving web 10. The applicator 18 normally comprises a roller apparatus that picks up the slurry 44 from a supply trough and deposits a pattern of slurry 44 directly onto the moving web 10. The slurry 44 is made up of a mixture of microcapsules containing a fragrance, usually in liquid form, and a binder or adhesive compound. It is well known that when in slurry-form, the microcapsules remain wet and therefore are not subject to rupture and release the fragrance which they contain. When the adhesive with which the microcapsules are mixed dries, however, the microcapsules also dry and become very brittle and are easily subject to rupture and release the fragrance liquid they contain.

Preferably at the same time the applicator 18 applies the slurry 44, a pattern gluer 20 applies an area of seam glue 46 to the moving web 10 as shown in FIG. 2. It will be understood that the particular configuration and location in which the seam glue 46 is applied is a matter of choice, and that the invention disclosed herein is not so limited.

Proceeding to the next step, the moving web 10 is folded longitudinally along a first fold line 48 by an initial plow folder 22 thereby defining a first panel 50 of the web 10 extending between an outer edge 52 of the web 10 and the first fold line 48. Folding the web 10 at initial plow folder 22 also results in securing the first panel 50 to the remainder of the web 10 where the seam glue 46 was previously applied, and at the location of the microcapsule/adhesive slurry patch 44. It should be understood that the amount of seam glue 46 applied is dependent upon the desired quality of the product produced, and in some cases, may be eliminated completely in view of the adhesion between the first panel 50 and the slurry patch 44 which produces the result sought to be achieved at this point in the manufacturing method disclosed.

Moving forward in the process, the first folded moving web 10 is next preferably die cut at two locations by die cutter 24. First, the web 10 is partially cut around the periphery of the slurry patch 44 which is sandwiched between the first panel 50 and the remainder of the web 10 to define a wick 53. It is important to note that the wick 53 remains attached to the web 10 at nicks 54 which are not cut from the web 10 by the die cutter 24. The web 10 is also partially cut at a second location by the die cutter 24 to define a cap 56, and a finger hole 58 as illustrated in FIG. 2. Again, the cutter operates to leave nicks 54 allowing the cap 56 to remain attached to the web 10 throughout the method disclosed. The finger hole 58, however, is cut completely through the web. It should be appreciated that the location of the cap 56 and the finger hole 54 are not limited to those illustrated. For example, the cap 56 could be defined immediately above the wick 53, in which case the finger hole 58 could be enlarged to provide access to the entire cap 56 as will be more fully understood upon reading the descriptions given below. It should also be apparent to one of ordinary skill in the art that defining the wick 53 and cap 56, and cutting out the finger hole 58 with the die cutter 24 could be completed prior to folding the web along first fold line 48 without deviating from the scope of the invention.

Moreover, the amount of material removed from the web 10 by die cutter 24 can be altered significantly and still result in defining the wick 53, cap 56 and finger hole 58, and maintaining partial connection between these components and the remainder of the moving web 10 at nicks 54. In addition, it should be obvious that the result of any of the folding steps herebefore or hereafter discussed can also be achieved by longitudinally slitting the web 10 and thereafter repositioning the portion slit-away into the location where the completion of the fold would have positioned that portion of the web. The equipment and procedure for performing any such operation, sometimes referred to as "ribboning" the web, is well known in the art and will therefor be omitted here.

The moving web 10 next travels to a second pattern gluer 26 which deposits seam glue 60 on the first panel 50 as shown. Thereafter, an intermediate plow folder 28 is utilized to make a second longitudinal fold line 62 in the moving web 10 thereby defining a second panel 64 extending between the first fold line 48 and the second fold line 62, and securing the first panel 50, at the seam glue 60, to the remainder of the moving web 10.

So that the present invention may be thoroughly understood, it may be helpful to point out that, at this stage of the method, the first panel 50 is enclosed between the second panel 64 from above, and a remainder of the moving web 10 from below. Moreover, the second fold line 62 now represents the outermost margin of the moving web 10.

The moving web 10 next proceeds to a third pattern gluer 30 which applies seam glue 66 at a location on the second panel 64 and, in addition, deposits an area of glue 68 on the exposed portion of the wick 53. The moving web is then folded longitudinally once again along a third fold line 70 by a final plow folder 32 which defines a third panel 74 extending between the second fold line 62 and the third fold line 70. The completion of the third longitudinal fold 70 also causes the wick 53 to adhere to the cap 56 at glue area 68 thereby forming an integral removable element 76 (FIG. 3) comprising the combination of wick 53 and cap 56 which is manually accessible through finger hole 58. In addition, the third longitudinal fold 70 secures the second panel 64 to the remainder of the web 10 at seam glue 66 thus defining a fourth panel 78 (FIG. 3) extending between the third fold line 70 and the seam glue 66.

Figure 3:
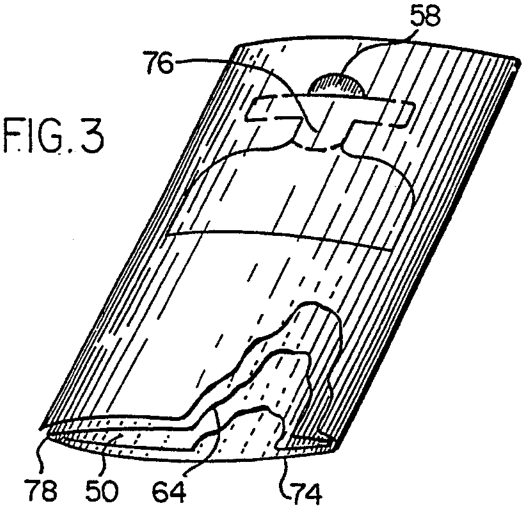
FIG. 3 is a perspective view of a completed individual fragrance sampler resulting from the inventive method.
Figure 4:
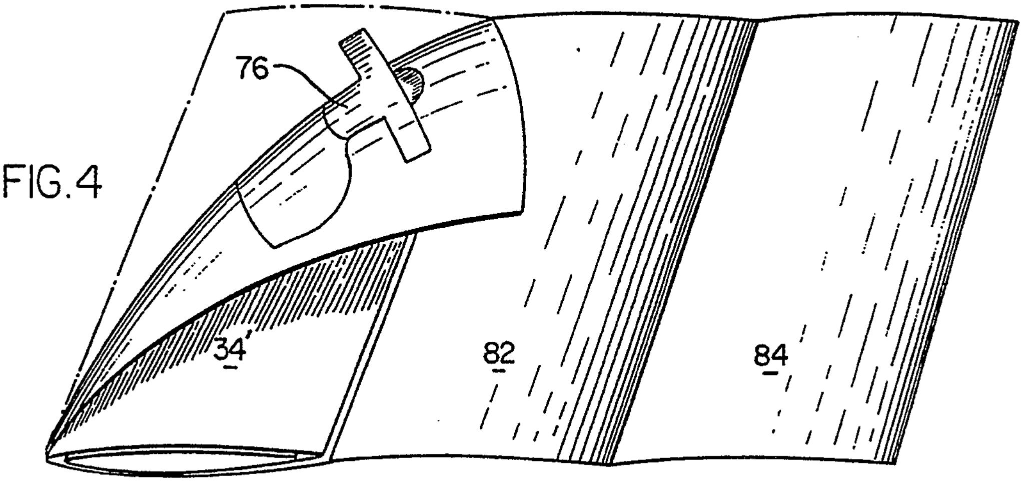
FIG. 4 is a perspective view of a completed fragrance sampler resulting from another embodiment of the invention.

Finally, the moving web 10 is severed transversely into individual fragrance samplers 34 by a rotary cutter 36. Each individual sample 34 includes a removable element 76 carrying a patch of slurry 44 which can be manually withdrawn from the remainder of the sampler 34 by grasping the element 76 through finger hole 58 and pulling upward and outward with sufficient force to break away nicks 54. Once removed, the element 76 can be manipulated to spread apart the wick 53 thereby causing the microcapsules within the dried slurry 44 to rupture and the fragrance sample to be released. Other details relating to the function and operation of such a fragrance sampler 34 are discussed in U.S. Pat. No. 5,050,910 and therefor omitted here. If desired, the dimension of the moving web 10 can be adjusted so that an innermost edge 80 of the web 10 substantially coincides with the seam glue 66, in which case the four panels 50, 64, 74 and 78 would constitute the entire width of the web 10 as shown in FIG. 3. Alternatively, the web can be dimensioned to include additional width, exclusive of panels 50, 64, 74 and 78, which additional width can be processed further, such as by additional plow folders to form multiple pages 82, 84 in a booklet including the individual fragrance sampler 34 as shown in FIG. 4.

Figure 5:
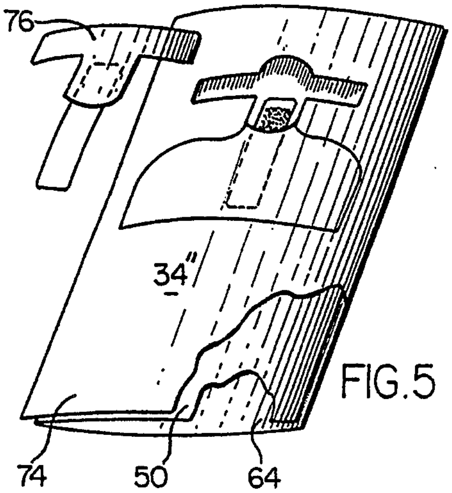
FIG. 5 is a perspective view of a completed sampler resulting from still another alternate embodiment of the inventive method.

It should also be obvious to one of ordinary skill in the art that the cap 56 could be die cut into the third panel 74, and glue area 68 could be applied to the wick portion 53 of the first panel 50, in which case the completion of the second longitudinal fold would form the removable element 76 in a slightly modified construction of the sampler 34" as shown in FIG. 5. As before, additional panels for added graphic material can also be provided to this modified construction 34" if desired.

The invention is claimed as follows:

1. A method of making a plurality of devices having manually-removable elements containing a selectively releasable fragrance, comprising the steps of:

a. providing a moving web of material;

b. longitudinally cutting said moving web of material to form first and second moving webs of material;

c. applying a slurry of adhesive and microcapsules to one of said moving webs of material, said microcapsules containing a fragrance substance;

d. combining said first moving web of material with said second moving web of material so that said slurry is sandwiched between said first and second moving webs;

e. partially die cutting said first and second moving webs of material around said slurry to define a manually-removable element, and;

f. transversely cutting said first and second moving webs of material into separate samplers, each including a manually-removable element containing said selectively releasable fragrance which will release a fragrance after removal from the sampler and upon separation of said first and second webs.

2. A method of making a plurality of devices having manually-removable elements as recited in claim 1, further including the step of applying an area of adhesive to said first moving web of material spaced from said slurry to further secure one of said webs and second moving webs of material together.

* * * * *

UNITED STATES PATENT AND TRADEMARK OFFICE

CERTIFICATE OF CORRECTION

PATENT NO. : 5,389,174
DATED : February 14, 1995
INVENTOR(S) : Susan Hibsch and Sharon Rubar It is certified that error appears in the above-indentified patent and that said Letters Patent is hereby corrected as shown below:

Column 6, Line 26, "fragrance, comprising" should read -- fragrance in a continuous manner, comprising --

Column 6, Line 27, "a moving" should read -- a first moving --

Column 6, Line 28, "said moving" should read -- said first moving --

Column 6, Line 29, "to form first and second moving webs of material;" should read -- to form a second moving web of material; --

Column 6, Line 31, "one of said moving webs of material," should read -- said first moving web of material --

Column 6, Line 33, "said first moving web" should read -- said second moving web --

Column 6, Line 34, "said second moving web" should read -- said first moving web --

UNITED STATES PATENT AND TRADEMARK OFFICE
CERTIFICATE OF CORRECTION

PATENT NO. : 5,389,174

DATED : February 14, 1995

INVENTOR(S) : Susan Hibsch and Sharon Rubar

It is certified that error appears in the above-identified patent and that said Letters Patent is hereby corrected as shown below:

Column 6, Line 39, ", and" should be deleted.

Column 6, Line 40, "f. transversely cutting" should read -- f. longitudinally folding said combined first and second moving webs of material along a fold line, adjacent said second moving web, thereby causing said combined first and second moving webs to be folded onto a remaining portion of said first moving web of material, and; g. transversely cutting --

Column 6, Line 41, "samplers, each" should read -- samplers, each sampler --

Signed and Sealed this

Tenth Day of October, 1995

Attest:

Bruce Lehman

BRUCE LEHMAN

Attesting Officer

*Commissioner of Patents and Trademarks*